United States Patent [19]

Ohzeki

[11] Patent Number: 4,524,393
[45] Date of Patent: Jun. 18, 1985

[54] FACSIMILE COMMUNICATION SYSTEM

[75] Inventor: Yoshiaki Ohzeki, Atsugi, Japan

[73] Assignee: Ricoh Company, Ltd., Japan

[21] Appl. No.: 467,835

[22] Filed: Feb. 18, 1983

[30] Foreign Application Priority Data

Feb. 19, 1982 [JP] Japan ................... 57-25387

[51] Int. Cl.³ .............................................. H04N 1/32
[52] U.S. Cl. .................................... 358/257; 358/280
[58] Field of Search ............. 358/256, 280, 286, 257; 340/825.31, 825.52, 825.51, 825.5

[56] References Cited

U.S. PATENT DOCUMENTS

| | | | |
|---|---|---|---|
| 4,000,371 | 12/1976 | Ogawa | 358/257 |
| 4,114,139 | 9/1978 | Boyd et al. | 340/825.31 |
| 4,249,216 | 2/1981 | Kanda | 358/257 |
| 4,419,697 | 12/1983 | Wada | 358/257 |

Primary Examiner—John C. Martin
Assistant Examiner—Edward L. Coles
Attorney, Agent, or Firm—Guy W. Shoup

[57] ABSTRACT

A facsimile communication system for carrying out communication between a transmitter and a receiver, whether it is inside or outside of a particular group, is provided. The receiver comprises a facsimile reception system, a first memory for storing information as to terminal numbers and designated communication time of prearranged transmitter terminals, a second memory for storing information as to terminal numbers and temporarily designated communication time of transmitter terminals which are not prearranged, a reception allowable terminal memory to which the terminal number is supplied when the corresponding designated time is reached and a comparator for comparing the terminal number transmitted from the transmitter and the terminal number in the allowable terminal memory, the comparator supplying a reception allowable signal when the two terminal numbers are matched, while, a reception rejection signal when the two terminal numbers are mismatched.

6 Claims, 2 Drawing Figures

FACSIMILE COMMUNICATION SYSTEM

BACKGROUND OF THE INVENTION

1. Field of the Invention

This invention relates to a facsimile communication system, and, in particular, to a facsimile communication system capable of arranging the order of communication operations to be carried out.

2. Description of the Prior Art

In a prior art facsimile communication system, a facsimile terminal, when acting as a receiver terminal, is so structured to receive the information transmitted from a transceiver facsimile terminal without selection. This is not so much of a problem if facsimile communication is to be carried out in a particular group of facsimile terminals because the rush of communication may be avoided by prearranging the time of communication to be carried out between particular terminals. However, the recent trend is to standardize the facsimile communication system so that communication may be carried out with any facsimile terminal including those which belong to other groups. This then presents a problem in arranging the order of communication because transmission of information from outside of the particular group will occur frequently and irregularly in time. For example, if a transmission operation from an outside facsimile terminal to one of the facsimile terminals of the same group continues for an extended period of time, the other facsimile terminals of the group must wait, and dialing or calling operation must be repeatedly carried out until the transmission operation has finished and the desired terminal accepts the call, so that the use rate of the system becomes extremely lowered. In order to avoid such a problem, the operator must watch the receiving state of the facsimile terminal periodically, which however negates the usefulness of an automatic receiving function usually provided in a facsimile terminal for the purpose of saving manpower. On the other hand, use has been made of the so-called "group communication system" in which the identification information of each of the terminals belonging to the same group is registered and the communication with a facsimile terminal which does not belong to the group is totally rejected. Such a system, however, is diametrically opposite to the idea of the standardization of the facsimile communication system.

SUMMARY OF THE INVENTION

Briefly stated, in accordance with the present facsimile communication system, a transceiver terminal includes a data storing unit for temporarily storing the data to be transmitted thereby allowing to transmit the thus stored data at any time as desired, and the time of communication between a receiver and the data storing unit of the transceiver is automatically arranged.

Therefore, it is a primary object of the present invention to provide an improved facsimile communication system.

Another object of the present invention is to provide a facsimile communication system having an increased use rate.

A further object of the present invention is to provide a facsimile communication system which allows to carry out the communication operation with the facsimile terminals outside a particular group without impairing the automatic receiving function.

A still further object of the present invention is to provide a facsimile communication system which may contribute to the standardization of the system.

Other objects, advantages and novel features of the present invention will become apparent from the following detailed description of the invention when considered in conjunction with the accompanying drawings.

DESCRIPTION OF THE PREFERRED EMBODIMENTS

Figure 1:
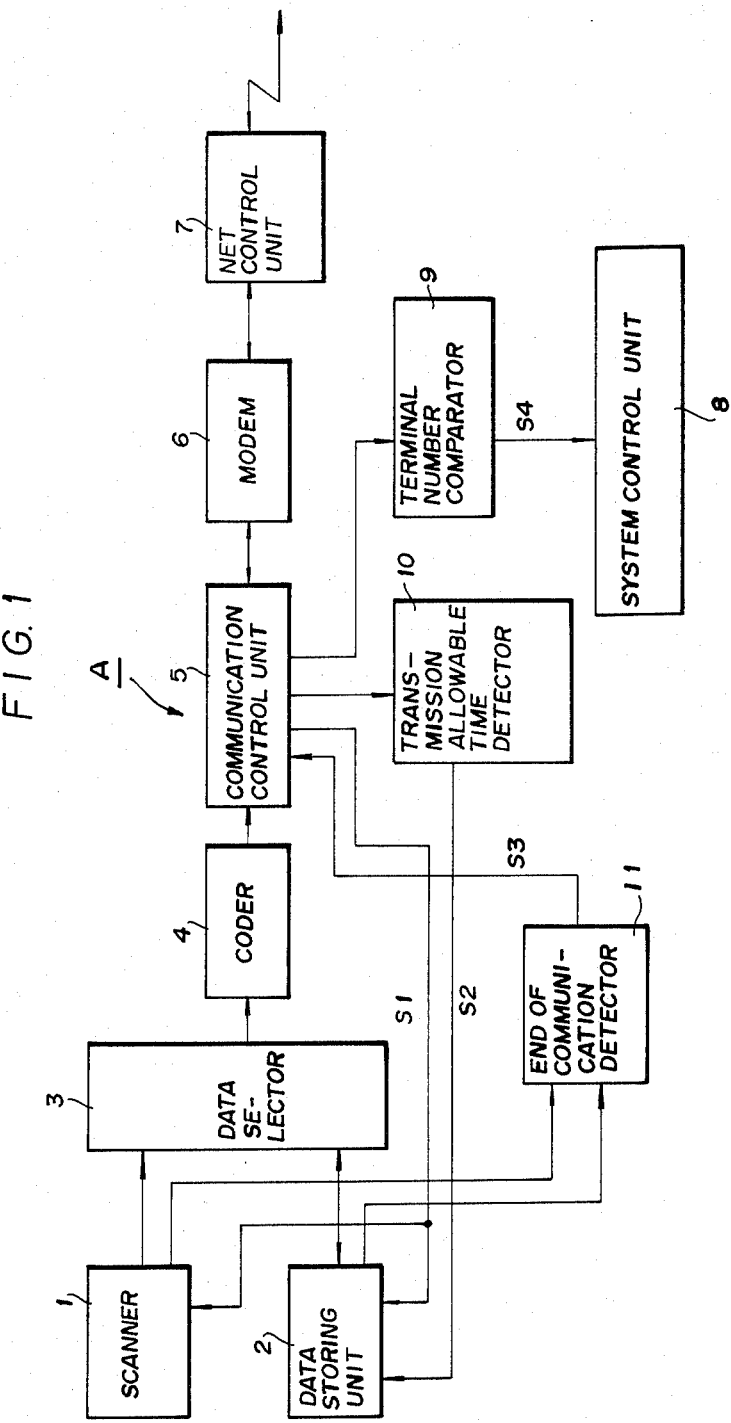
FIG. 1 is a block diagram showing the structure of a transmitter to be used in the facsimile communication system constructed in accordance with one embodiment of the present invention.

Referring now to the drawings, in the present facsimile communication system, a transmitter A includes, as shown in FIG. 1, a scanner 1 for reading an original image to be transmitted, a data storing unit 2 for temporarily storing the data produced by the scanner 1 and a data selector 3 which selects either one of the scanner 1 and the data storing unit 2 for operation. Also provided as connected to the data selector 3 is a coder 4 which carries out compression of data by coding the data supplied through the data selector 3. The coder 4 is connected to a communication control unit 5 which carries out the communication control by following a predetermined facsimile communication procedure by transmitting and receiving control signals to and from the intended receiver in order to transmit the coded data supplied from the coder 4 to the intended receiver. Then the unit 5 is connected to a MODEM 6 which carries out data transmission and transmission and reception of control signals, which, in turn, is connected to a net control unit 7. Accordingly, the elements denoted by numerals 1 through 7 form a facsimile transmission system of the transmitter A.

The transmitter A also includes a system control unit 8 which controls the overall system and a terminal number comparator 9 for comparing the reception allowable terminal number signal transmitted from the receiver and the terminal number signal of its own thereby supplying a result of the comparison to the system control unit 8. Moreover, the transmitter A includes a transmission allowable time detector 10 which detects a transmission allowable time signal S2 designating the allocated time for reception transmitted from the receiver and causes the transmission allowable time to be stored in the designated transmission time storing section of the data storing unit 2. Also provided in the transmitter A is an end-of-communication detector 11 which detects the end of reading of an original by the scanner 1 or the end of data read-out operation from the data storing unit 2 and supplies an end-of-communication signal S3 to the communication control unit 5. It is to be noted in FIG. 1 that "S1" indicates a polling signal to be supplied to the data storing unit 2 and "S4" indicates a comparison signal supplied as an output from the comparator 9.

Figure 2:
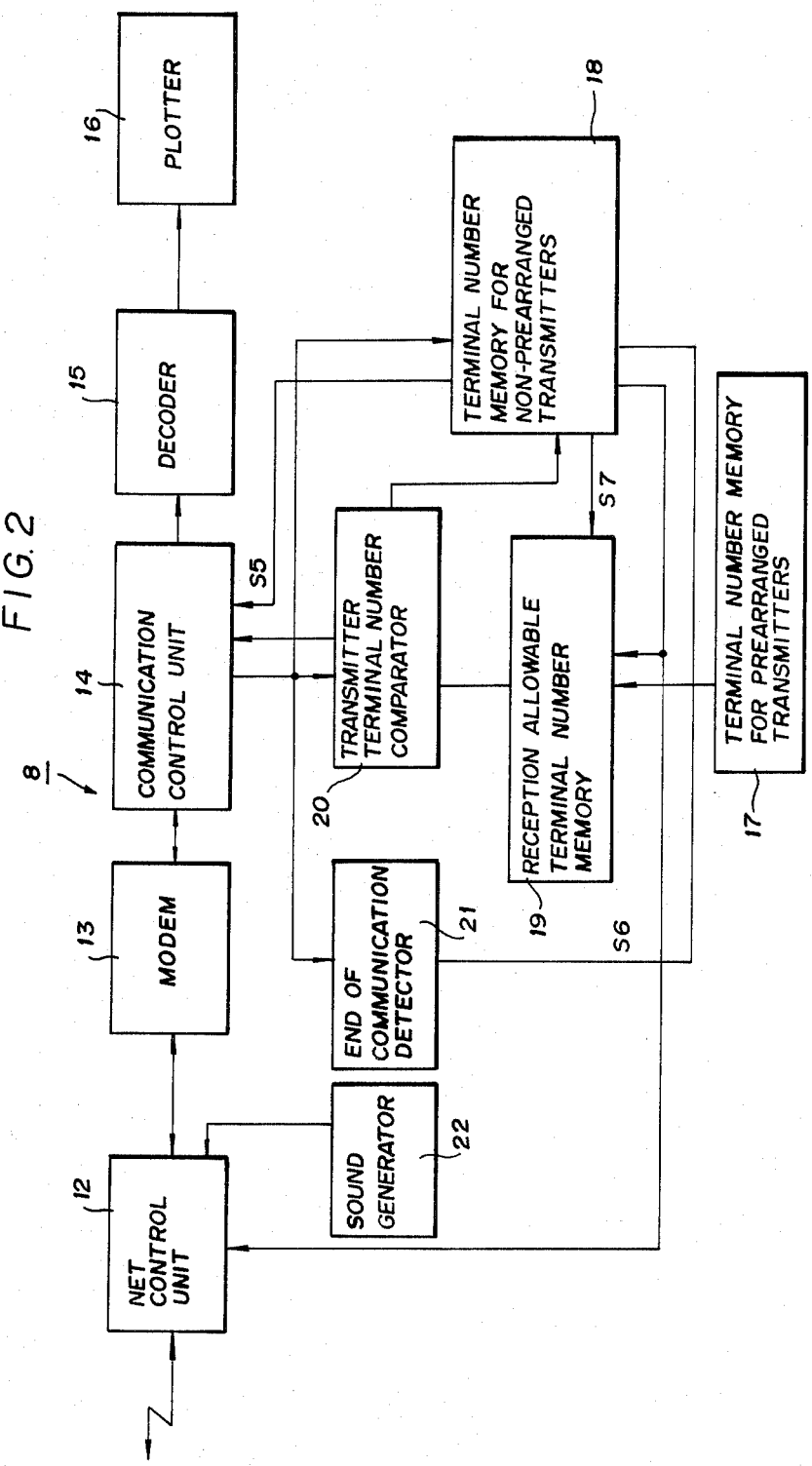
FIG. 2 is a block diagram showing the structure of a receiver to be used together with the transmitter of FIG. 1 in the facsimile communication system constructed in accordance with one embodiment of the present invention.

On the other hand, as shown in FIG. 2, a receiver B includes a net control unit 12 and a MODEM 13 connected to the unit 12 for transmitting and receiving control signals to and from the transmitter A and receiving the data transmitted from the transmitter A, a communication control unit 14 for carrying out the communication control by following a predetermined facsimile reception procedure by transmitting and receiving control signals to and from the transmitter in order to receive data from the transmitter, a decoder 15 for expanding the data received by decoding and a plotter 16 for recording an image on the basis of the decoded data supplied from the decoder 15, which together form a facsimile receiving system of the receiver B. The receiver B also includes a prearranged transmitter terminal number memory 17 for storing the information as to terminal numbers of previously registered transmitters in the order of the transmission allowable time and a non-prearranged transmitter terminal number memory 18 which stores the information of the terminal number of a non-prearranged transmitter requesting transmission of data to the receiver B by setting the order of communication in the idle time period other than the prearranged communication time period, and, at the same time, transmits to the requesting transmitter the designated transmission allowable time and its terminal number.

Moreover, the receiver B includes a reception allowable terminal number memory 19 into which the transmitter terminal number is set as read from the transmitter terminal number 17 or 18 at a designated time and a transmitter terminal number comparator 20 which compares the transmitter terminal number transmitted from the transmitter A and the transmitter terminal number set in the reception allowable terminal number memory 19 to supply a reception allowable signal when the both signals coincide or a reception rejection signal when the both signals do not coincide, and, at the same time, supplies an operation command signal to the transmitter terminal number memory 18. Also provided in the receiver B are an end-of-communication detector 21 which causes to reset the reception allowable terminal number memory 19 by detecting an end-of-communication signal transmitted from the transmitter A and a sound generator 22 which generates sound information to be transmitted to the transmitter A appropriately.

In the case where the allocated transmission allowable time still remains more than a predetermined amount at the time of detection of end of communication, the next transmitter terminal number stored in the terminal number memory 18 is read out and set in the reception allowable terminal number memory 19; at the same time, the next transmitter terminal number thus read out is also supplied to the net control unit 12 to carry out the automatic calling of the desired transmitter.

In operation, the transmitter A places a call by dialing the terminal number of the desired receiver B when the prearranged time for carrying out communication with the receiver B has been reached and waits for a response. In this instance, in the case where the data stored in the data storing unit 2 is to be transmitted, the autodialing operation is carried out in accordance with an instruction supplied from the data storing unit 2. When called, the receiver B responds to the transmitter A by transmitting the reception allowable terminal number stored in the reception allowable terminal number memory 19 during the course of facsimile reception procedure. Then, at the transmitter A, the reception allowable terminal number transmitted from the receiver B is examined whether or not it coincides with the terminal number of its own by the comparator 9, and, if coincidence is obtained, the transmitter A transmits its own terminal number to the receiver B. On the other hand, if coincidence is not obtained, it transmits its own terminal number to the receiver B and interrogates the allowable transmission time. In the case of the transmitter which is not provided with the terminal number comparator 9, it transmits its own terminal number immediately upon reception of a response from the receiver B.

When the receiver B receives the transmitter terminal number transmitted from the transmitter A, it compares the thus received transmitter terminal number with the transmitter terminal number stored in the reception allowable terminal number memory 19 at the transmitter terminal number comparator 20; then, if it has been found that both numbers coincide, a reception allowable signal is transmitted to the transmitter A through the communication control unit 14, and the reception of data transmitted from the transmitter A is initiated. On the other hand, in the case of lack of coincidence between the two terminal numbers, the transmitter terminal number transmitted from the transmitter A is stored into the non-prearranged transmitter terminal number memory 18 together with a designated time. In this instance, the designation of time for communication is carried out in the order of inquiry for transmission allowable time made by the transmitter A. The designation of time for communication may be made in any manner. For example, the time for communication may be designated appropriately depending upon an expected amount of data (number of original pages) or an expected amount of time required for transmission to be transmitted from the transmitter A, or, alternatively, it may be designated on the basis of a predetermined time period, e.g., 30 minutes, which is made available whenever communication is requested by the transmitter A.

When the time for communication is designated at the terminal number memory 18, a transmission allowable time signal S5 is transmitted together with a reception rejection signal to the transmitter A through the communication control unit 14. Upon receiving of the reception rejection signal transmitted from the receiver B, the transmitter A stops transmission immediately. On the other hand, at the transmitter A provided with the transmission allowable time detector 10 and the data storing unit 2, it detects the transmission allowable time signal S2 having the information of designated time for communication, which has been transmitted together with the reception rejection signal from the receiver B, and causes the transmission allowable time signal S2 to be stored in the data storing unit 2. And, thus, when the designated time is reached, the data stored in the data storing unit 2 is transmitted automatically.

The transmitter A initiates its transmission of data by receiving a reception allowable signal from the receiver B, or the transmitter A initiates its automatic transmission of data due to the arrival of the time designated by the receiver B. And, when the transmission of data is completed, the end-of-communication detector 11 supplies an end-of-communication signal S3 which is then transmitted to the receiver B. In response thereto, the end-of-communication detector 21 of the receiver B supplies an end-of-communication signal S6 to the non-prearranged transmitter terminal number memory 18 thereby having the reception allowable terminal number memory 19 reset by a reset signal S7.

Under the condition, if the remaining portion of the time period allocated for the transmitter A is more than a predetermined amount of, for example, 15 minutes, the next transmitter terminal number stored in the non-prearranged transmitter terminal number memory 18 is read out to be set into the reception allowable terminal number memory 19, and, at the same time, this transmitter terminal number is also supplied to the net control unit 12 to call the transmitter A by automatic dialing. In this case, if the information regarding presence or absence of polling function also stored in the terminal number memory 18 indicates the presence of polling function, the data is automatically taken from the transmitter A by the polling operation. In the case of absence of polling function, on the other hand, the operator at the transmitter A is called by communication reservation, and when the operator responds, the idle or available time of the receiver B is automatically transmitted through the sound generator 22 thereby advising the availability for communication. Alternatively, the remaining time may be made open to communication with any terminal.

When the designated time is reached, the transmitter terminal number of the corresponding transmitter is read out of the prearranged transmitter terminal number memory 17 and set into the reception allowable terminal number memory 19, and then the receiver B waits for a call signal transmitted from the transmitter B. If the transmission of all of the data is not completed within the transmission allowable time period, the transmitter terminal number in the reception allowable terminal number memory 19 is written into the last position in the order of communication of the non-prearranged transmitter terminal number memory 18, and the transmission of data is temporarily terminated by transmitting the designated time for the next cycle of transmission of data together with a reception rejection signal to the transmitter A.

As a measure for the case in which a request for communication from the expected transmitter A has not been supplied during a predetermined time period as from the designated time, the reserved time period may be converted into an idle time period, or, alternatively, automatic dialing may be carried out from the receiver B to the transmitter A to generate the sound requesting transmission of data automatically. As a storing means of the prearranged transmitter terminal number memory 17, use may be preferably made of a semiconductor memory for storing the data regarding prearranged transmitter terminal numbers and their respective transmission allowable time which are input through keys by the operator. In order to allow to accept a request for communication originating from a transmitter terminal other than the prearranged ones, whether or not it is inside or outside of a particular group, the above embodiment is so structured that the transmitter terminal numbers are stored into the terminal number memory 18 in the order of request for communication by allocating the undesignated time band. Instead, it may also be so structured that a grant for communication is given immediately to a transmitter terminal which has requested communication in the undesignated time band. Besides, these two may be applied to the present invention in combination.

As described above, in accordance with the present facsimile communication system including at least one transmitter and at least one receiver, the receiver includes a first transmitter terminal number memory in which prearranged transmitter terminal numbers are stored in the order of the transmission allowable time, a second transmission terminal number memory for storing transmitter terminal numbers of non-prearranged transmitter terminals, whether outside or inside of the group, by arranging the time for communication at the idle time period other than the prearranged time period in response to the request for communication by those non-prearranged transmitter terminals and at the same time for supplying the thus stored terminal numbers together with the designated times to the transmitter terminals requesting communication, a reception allowable terminal number memory into which the transmission terminal number read out from either of the first or second transmitter terminal number memory at the designated time is set, and a transmitter terminal number comparator for comparing the thus set reception allowable terminal number and the transmitter terminal number transmitted from the transmitter terminal to supply a reception allowable signal to the transmitter terminal when the two numbers are matched or to supply a reception rejection signal to the transmitter and an operation command signal to the second transmitter terminal number memory when the two numbers are mismatched.

With this structure, since the transmission allowable time is appropriately arranged, communication not only with the other terminals in the same group but also with those terminals outside of the group may be carried out during the non-designated time period in which communication between terminals belonging to the same group is not carried out. The present invention is particularly suited for use with transmitter terminals having an automatic transmission function. Moreover, in accordance with the present invention, by knowing the expected time period which is necessary for transmitting data from the transmitter, the allocation or designation of time may be carried out effectively. The remaining portion of the designated time period caused by the conditions of the transmitter terminal or the idle or non-designated time period may be made open for communication with any terminals. Besides, it may be so structured easily that data is automatically transmitted to the receiver from the designated transmitter capable of carrying out the polling function during such a residual time period, thereby allowing to enhance use rate.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:
1. A facsimile communication system for carrying out communication between a transmitter and a receiver, said receiver comprising;
   a facsimile receiving system for receiving and processing signals transmitted from said transmitter;
   first storing means for storing transmitter terminal numbers of prearranged transmitters and their designated time for communication;
   second storing means for storing transmitter terminal numbers of non-prearranged transmitters and their temporarily designated time for communication which is designated in accordance with the request for communication by said non-prearranged trans- mitters, said second storing means supplying the thus stored terminal numbers and the temporarily designated time to the corresponding non-prearranged transmitters;

allowable transmitter terminal number receiving means for receiving a transmitter terminal number from either one of said first and second storing means when the corresponding designated time is reached; and comparing means for comparing the transmitter terminal number contained in said allowable transmitter terminal number receiving means and the transmitter terminal number currently transmitted from the transmitter, said comparing means supplying a reception allowable signal to said transmitter when the two terminal numbers are matched; whereas, said comparing means supplying a reception rejection signal to said transmitter and at the same time an operation command signal to said second storing means when the two terminal numbers are mismatched.

2. A system of claim 1 wherein said facsimile receiving system includes a net control unit, a MODEM connected to said net control unit, a communication control unit connected to said MODEM for carrying out the communication control by following a predetermined facsimile reception procedure, a decoder for decoding the data transmitted from the transmitter and a plotter for plotting an image on a recording medium.

3. A system of claim 1 wherein said receiver further comprises an end-of-communication detector for resetting said allowable transmitter terminal number receiving means upon detection of an end-of-communication signal transmitted from said transmitter.

4. A system of claim 1 wherein said transmitter includes a facsimile transmission system, a transmission allowable time detector for detecting the designated time of communication transmitted from said receiver and an end-of-communication detector for detecting the end of data to be transmitted to supply an end-of-communication signal.

5. A system of claim 4 wherein said facsimile transmission system includes a scanner for scanning an original, a coder connected to said scanner for coding the data supplied from said scanner, a communication control unit connected to said coder for carrying out the transmission control by following a predetermined facsimile transmission procedure, a MODEM connected to said communication control unit and a net control unit connected to said MODEM.

6. A system of claim 5 wherein said facsimile transmission system further includes data storing means for temporarily storing the data produced by said scanner and a data selector through which said scanner and said data storing means are connected to said coder.

* * * * *